US012681150B2

(12) United States Patent
Gardner et al.

(10) Patent No.: US 12,681,150 B2
(45) Date of Patent: Jul. 14, 2026

(54) TRIANGULATION SENSOR

(71) Applicant: Banner Engineering Corp.,
Minneapolis, MN (US)

(72) Inventors: Timothy S. Gardner, Eden Prairie,
MN (US); Ilija Milosevic, Minnetonka,
MN (US); Darin Dewayne Wampler,
Prior Lake, MN (US); **Jeremy
Eickhoff**, Plymouth, MN (US)

(73) Assignee: Banner Engineering Corp.,
Minneapolis, MN (US)

( * ) Notice: Subject to any disclaimer, the term of this
patent is extended or adjusted under 35
U.S.C. 154(b) by 127 days.

(21) Appl. No.: 18/652,216

(22) Filed: May 1, 2024

(65) Prior Publication Data

US 2024/0280671 A1 Aug. 22, 2024

Related U.S. Application Data

(63) Continuation of application No. 17/947,915, filed on
Sep. 19, 2022, now Pat. No. 11,982,763, which is a
(Continued)

(51) Int. Cl.
*G01S 7/48* (2006.01)
*G01J 1/02* (2006.01)
(Continued)

(52) U.S. Cl.
CPC .......... *G01S 7/4813* (2013.01); *G01J 1/0252*
(2013.01); *G01J 1/0271* (2013.01); *G01J
1/0403* (2013.01);
(Continued)

(58) Field of Classification Search
CPC ....... G01S 7/4813; G01S 17/48; G02B 7/022;
G02B 7/028; G01J 1/0252; G01J 1/0271;
G01J 1/0403
See application file for complete search history.

(56) References Cited

U.S. PATENT DOCUMENTS

| | | | |
|---|---|---|---|
| 5,396,487 A | 3/1995 | Abe et al. | |
| 6,215,604 B1 | 4/2001 | Hori | |

(Continued)

FOREIGN PATENT DOCUMENTS

| | | |
|---|---|---|
| CA | 2115859 A1 | 8/1995 |
| DE | 19623418 A1 | 12/1997 |
| DE | 202012104175 U1 | 11/2012 |

OTHER PUBLICATIONS

"Micro-Epsilon optoNCDT 1420 sensor" Instruction Manual, Micro-
Epsilon Messtechnik Gmbh & Co. KG, Ortenburg, Germany. At
least as early as Dec. 8, 2016. 122 pages.
(Continued)

*Primary Examiner* — Kevin K Pyo
(74) *Attorney, Agent, or Firm* — Mueting Raasch Group

(57) ABSTRACT

A sensor device has a metal sensor housing with a housing
base coupled to a frame base of a metal optical frame. A
device mounting plate is orthogonal to the frame base. A
securing device secures an optical communication device to
the device mounting plate. A barrel mounting channel has
first and second sidewalls, each extending obliquely to the
frame base and defining a linear translation pathway along
the frame base for a metal lens barrel. A fastener secures the
metal lens barrel to the first and second sidewalls. A glass
lens is in contact with three protrusions extending outward
from an inner annular surface of the lens barrel. The optical
communication device is configured to be in optical com-
munication with the lens and is secured in a particular
position in a translation plane mutually defined by the device
mounting plate and the optical communication device.

18 Claims, 10 Drawing Sheets

Related U.S. Application Data continuation of application No. 16/556,721, filed on Aug. 30, 2019, now Pat. No. 11,448,731.

(51) Int. Cl.
| | |
|---|---|
| *G01J 1/04* | (2006.01) |
| *G01S 7/481* | (2006.01) |
| *G01S 17/48* | (2006.01) |
| *G02B 7/02* | (2021.01) |

(52) U.S. Cl.
CPC .............. *G01S 17/48* (2013.01); *G02B 7/022* (2013.01); *G02B 7/028* (2013.01)

(56) References Cited

U.S. PATENT DOCUMENTS

| | | | |
|---|---|---|---|
| 7,795,577 | B2 | 9/2010 | Olsen et al. |
| 8,996,172 | B2 | 3/2015 | Shah et al. |
| 9,028,159 | B2 * | 5/2015 | Pavithran ................. G03B 3/10 396/529 |
| 9,664,877 | B2 | 5/2017 | Campbell |
| 11,448,731 | B2 | 9/2022 | Gardner et al. |
| 2001/0010600 | A1 | 8/2001 | Azegami |
| 2018/0180738 | A1 | 6/2018 | Alexandrov et al. |
| 2021/0063539 | A1 | 3/2021 | Gardner et al. |
| 2023/0082922 | A1 | 3/2023 | Gardner et al. |

OTHER PUBLICATIONS

"V Mounts" Datasheet [online]; @ 1999-2020 Thorolabs, Inc. Newton, NJ [retrieved on Mar. 5, 2020]. Retrieved from the , Internet: <URL:https://www.thorlabs.com/navigation.cfm?guide_ID=56>, 1 page.

"CMOS Multi-Function Analog Laser Sensor, IL Series" Datasheet. Keyence Corporation of America, Woodcliff Lake, NJ, 2010; 12 pages.

"CMOS Type Micro Laser Distance Sensor, HG-C Series" Datasheet. Panasonic Industrial Devices SUNX Co., Ltd., Aichi, Japan, 2014; 14 pages.

"OD1-B015H05A14 Displacement Measurement Sensors" Product Data Sheet, SICK AG, Waldkirch, Germany, 2020; 7 pages.

"OD1-B100C50114 Displacement Measurement Sensors" Product Data Sheet, SICK AG, Waldkirch, Germany, 2020; 8 pages.

"V Block Cylindrical Device Mounts," Datasheet [online]; ©2020 Newport Corporation, Irvine, CA [retrieved on Mar. 5, 2020]. Retrieved from the Internet: <URL:https://www.newport.com/f/v-block-cylindrical-device-mounts>; 2 pages.

"V-Block Cylindrical Object Holder," Datasheet [online]; Unice, Taoyuan City, Taiwan [retrieved on Mar. 5, 2020]. Retrieved from the Internet: <URL:https://www.unice-eo.com/product/optomechanics/cylindrical-object-mounts/v-block-cylindrical-object-holder>; 2 pages.

Goodman, "Cylinders in Vs—An Optomechanical Methodology," Proceedings of SPIE, vol. 3132, Optomechanical Design and Precision Instruments, Oct. 1997; pp. 196-217.

Goodman, "More Cylinders in Vs," Optomechanical Engineering, 2000, Proceedings of SPIE, vol. 4198, (Mar. 6, 2001); pp. 9-30.

Smith, "Modern Optical Engineering, The Design of Optical Systems," McGraw-Hill, New York, NY, Third Edition, published 2000. Title page, copyright page, and pp. 575-581.

* cited by examiner

TRIANGULATION SENSOR

PRIORITY CLAIM

This is a continuation application of U.S. patent application Ser. No. 17/947,915, filed Sep. 19, 2022, which is a continuation of U.S. patent application Ser. No. 16/556,721, filed Aug. 30, 2019, the disclosures of which are incorporated by reference herein in their entireties.

TECHNOLOGICAL FIELD

The present disclosure is generally related to sensors. More particularly, the present disclosure is related to triangulation sensors.

BACKGROUND

Optical sensors can be used for a variety of purposes, but generally are used to sense objects within a particular range. In addition to sensing objects, optical sensors can be used to provide data associated with the sensed objects. For example, some optical sensors are used to sense and calculate the distance of a particular object.

The environmental conditions within which an optical sensor operates can impact the performance of the sensor. For example, fluctuations in ambient temperature can impact the accuracy of the sensor based on the response of the sensor's components to the temperature. Although the presence of an internal microprocessor, temperature measuring device (e.g. thermocouple), and appropriate programming allows for some compensation, improvements can be made. Furthermore, improvements to the processes associated with manufacturing optical sensors can be made.

SUMMARY

The technology disclosed herein relates to a sensor device structure that provides a relative reduction in the optomechanical thermal sensitivity of the device and that can simplify some manufacturing steps.

In some embodiments, a sensor device is disclosed. The sensor device has a metal sensor housing with a housing base. A metal optical frame has a frame base that is coupled to the housing base, and a first device mounting plate is orthogonal to the frame base. A first barrel mounting channel has a first sidewall extending obliquely to the frame base and a second sidewall extending obliquely to the frame base. A first metal lens barrel is disposed in the first barrel mounting channel in contact with the first and second sidewalls, where the first and second sidewalls define a linear translation pathway of the first lens barrel along the frame base. The first lens barrel has an inner annular surface and three protrusions extending outward from the inner annular surface to define a first lens mounting structure, and a first barrel fastener secures the first lens barrel to the first and second sidewalls. A first glass lens is in contact with each of the three protrusions of the first lens mounting structure. A first optical communication device is secured to the first device mounting plate with a first securing device, where the first optical communication device is configured to be in optical communication with the first glass lens and is secured in a particular position in a first translation plane mutually defined by the first device mounting plate and the first optical communication device.

In some such embodiments, the optical frame is coupled to the sensor housing at exactly three locations. Additionally or alternatively, the optical frame defines a first elongate slot defined between the first sidewall and the second sidewall through the frame base. Additionally or alternatively, there is no adhesive disposed between the first barrel and the optical frame. Additionally or alternatively, the optical frame defines a second barrel mounting channel having a third sidewall extending obliquely to the frame base, a fourth sidewall extending obliquely to the frame base, and a second elongate slot defined between the third sidewall and the fourth sidewall through the frame base. Additionally or alternatively, the second elongate slot is oblique to the first elongate slot.

Additionally or alternatively, the sensor has a second metal lens barrel disposed in the second barrel mounting channel in contact with the third and fourth sidewalls, where the second lens barrel has an inner annular surface and three protrusions extending outward from the inner annular surface to define a second lens mounting structure and a second glass lens is in contact with each of the three protrusions of the second lens mounting structure. A second fastener extends through the second elongate slot, where the second fastener is coupled to the second lens barrel and the frame base.

Additionally or alternatively, the optical frame has a second device mounting plate orthogonal to the frame base, and the sensor device has a second optical communication device secured to the second device mounting plate with a second securing device, where the second optical communication device is configured to be in optical communication with the second glass lens and is secured in a particular position in a second translation plane mutually defined by the second device mounting plate and the second optical communication device. Additionally or alternatively, the first optical communication device is a laser emitter assembly. Additionally or alternatively, the first optical communication device is a linear array printed circuit board. Additionally or alternatively, the first barrel fastener is constructed of metal.

Some examples relate to a method of constructing a sensor. A metal optical frame having a frame base is secured to a housing base of a metal housing. A first lens is coupled to a first lens mounting surface of a first metal lens barrel, where the first lens mounting surface is defined by three protrusions extending from an inner annular surface of the first lens barrel. The first metal lens barrel is placed in contact with a first sidewall and a second sidewall of a first barrel mounting channel of the optical frame, where each of the first and second sidewalls are oblique to the frame base. The first metal lens barrel is slid linearly along the first barrel mounting channel to focus the first lens, and the first metal lens barrel is secured in the first barrel mounting channel after focusing the first lens. A first optical communication device is coupled to a first device mounting plate of the optical frame, where the first device mounting plate extends orthogonally to the frame base. The first optical communication device is translated relative to the first device mounting plate in a translation plane orthogonal to the frame base to optically align the first optical communication device with the first lens. The first optical communication device is secured to the first device mounting plate.

In some such embodiments, a first fastener extends through a first elongate slot defined by the frame base between the first sidewall and the second sidewall and sliding the first metal lens barrel in the first barrel mounting channel slides the first fastener along the first elongate slot. Additionally or alternatively, the first metal lens barrel is secured by securing the frame base to the first metal lens barrel. Additionally or alternatively, the first lens is coupled to the first lens mounting surface by disposing adhesive on the three protrusions of the first lens barrel and pressing the first lens on the three protrusions to create direct contact between each of the three protrusions and the first lens.

Additionally or alternatively, the adhesive is cured at a temperature greater than or equal to 70 degrees Celsius while applying pressure to the three protrusions and the first lens. Additionally or alternatively, the adhesive is cured with UV radiation while applying pressure to the three protrusions and the first lens. Additionally or alternatively, a second lens is coupled to a second lens mounting surface of a second metal lens barrel, where the second lens mounting surface is defined by three protrusions extending from an inner annular surface of the second lens barrel. Additionally or alternatively, the second metal lens barrel is placed in contact with a third sidewall and a fourth sidewall of a second barrel mounting channel of the optical frame, where each of the third and fourth sidewalls are oblique to the frame base. Additionally or alternatively, the second metal lens barrel is slid linearly along the second barrel mounting channel to focus the second lens and the second metal lens barrel is secured in the second barrel mounting channel after focusing the second lens.

Additionally or alternatively, a second optical communication device is secured to a second device mounting plate of the optical frame, where the second device mounting plate extends orthogonally to the frame base. The second optical communication device is translated relative to the second device mounting plate in a translation plane orthogonal to the frame base to optically align the second optical communication device with the second metal lens barrel and the second optical communication device is secured to the second device mounting plate. Additionally or alternatively, the first optical communication device is a laser emitter and the second optical communication device is a linear array printed circuit board.

Additionally or alternatively, the first metal lens barrel is pressed in the first barrel mounting channel with a first preload force while sliding the first metal lens barrel linearly along the first barrel mounting channel and securing the first metal lens barrel in the first barrel mounting channel. Additionally or alternatively, the first optical communication device is pressed against the first device mounting plate with a second preload force while translating the first optical communication device relative to the first device mounting plate and securing the first optical communication device to the first device mounting plate.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The technology disclosed herein relates to a sensor device structure that provides a relative reduction in the opto-mechanical thermal sensitivity of the device and that can simplify some manufacturing steps. In some embodiments the technology disclosed herein relates to a triangulation sensor that has a thermal distance error sensitivity of less than 15 $\mu$m/° C. In some embodiments the triangulation sensor has a thermal distance error sensitivity of less than 8 $\mu$m/° C. The sensor can be configured to operate in temperature conditions between −25° C. to 90° C. or ranging from −20° C. to 85° C.

Figure 1:
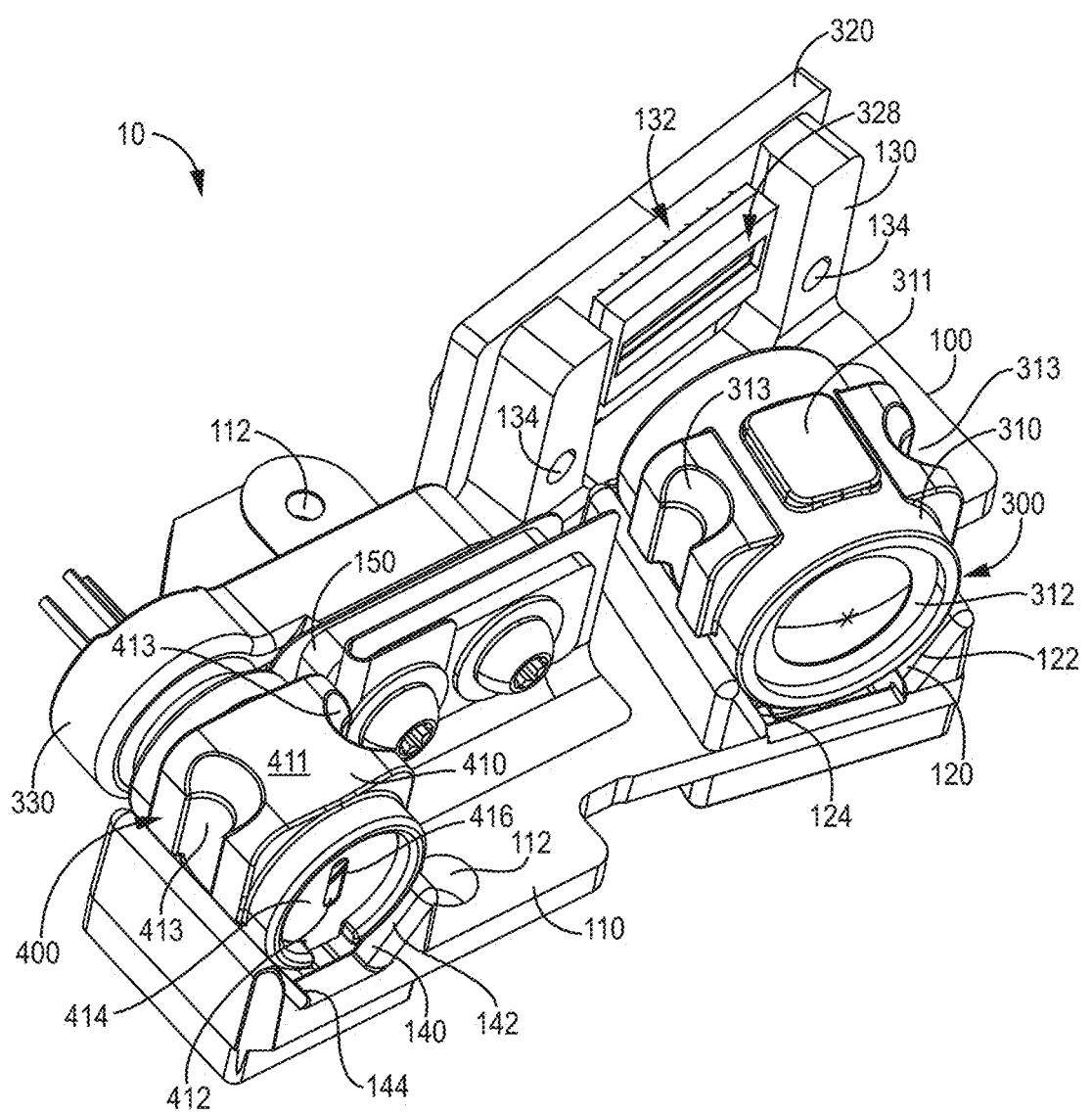
FIG. 1 is a perspective view of an example assembly consistent with the technology disclosed herein.

FIG. 1 is a perspective view of an example assembly 10 consistent with the technology disclosed herein. The assembly 10 is an example component of a sensor device and is configured to be coupled to a sensor housing, such as the sensor housing 200 depicted in FIG. 6. The assembly 10 is generally configured to send and/or receive optical data. In various embodiments, the assembly 10 is configured to sense the distance of an object. In some embodiments, the assembly 10 is an example component of an optical sensor device, such as a triangulation sensor.

The assembly 10 has an optical frame 100 and various components coupled to the optical frame 100. In the example of FIG. 1, at least a first lens assembly 300 and a first optical communication device 320 are secured to the optical frame 100. The first lens 312 and the first optical communication device 320 are configured to be in optical communication. The first optical communication device 320 is generally configured to receive or send optical data transferred through the first lens assembly 300. In some embodiments, the first optical communication device 320 is a laser emitter assembly, and in the currently-depicted embodiment the first optical communication device 320 is a linear array printed circuit board. In some embodiments, the linear array printed circuit board is constructed of an FR-4 (NEMA LI 1-1998 specification) material. The first optical communication device 320 particularly has an active area 328 that is configured to send or receive optical data.

Figures 2, 3:
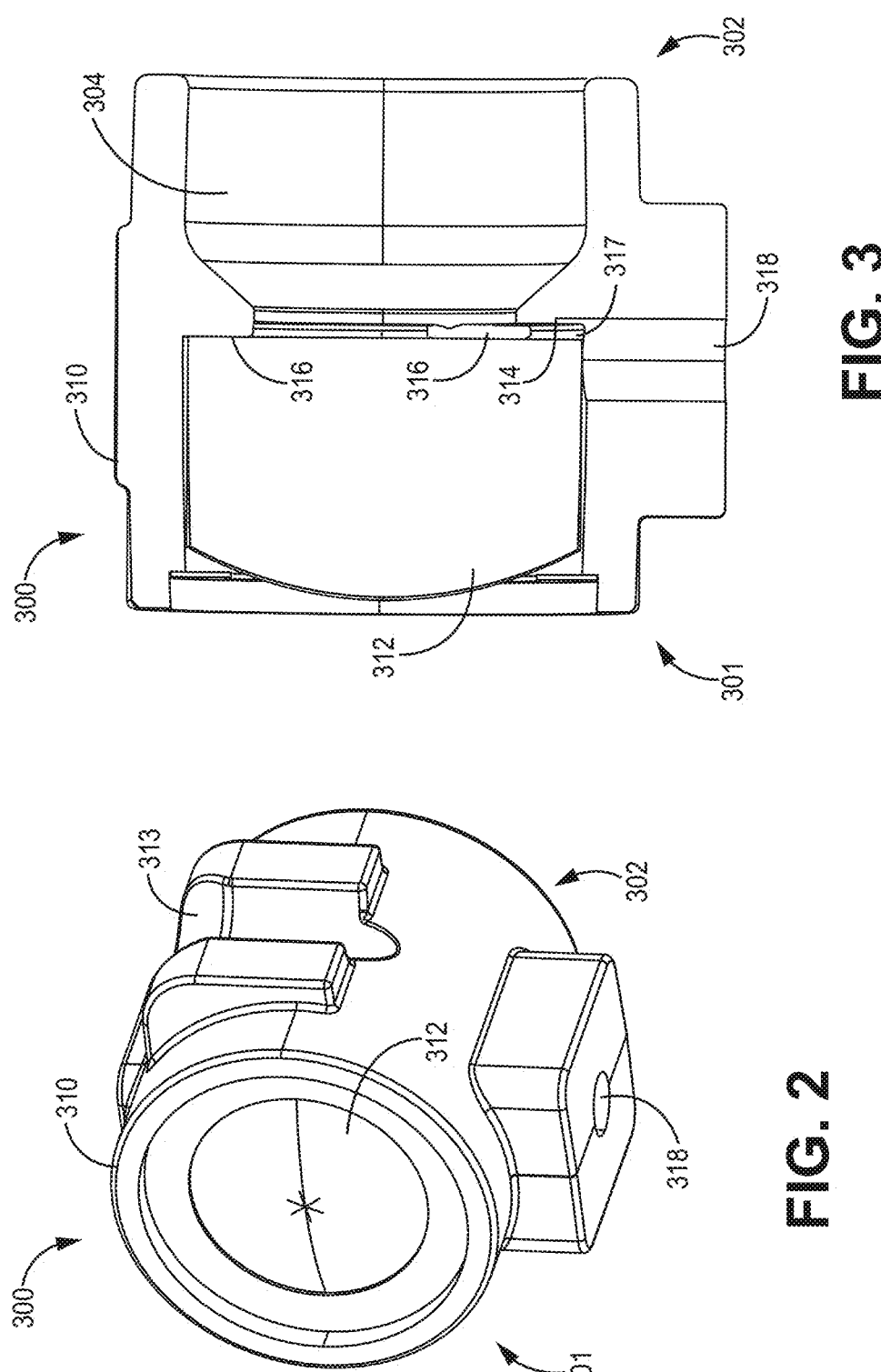
FIG. 2 is a perspective view of an example first lens assembly consistent with the technology disclosed herein.
FIG. 3 is a cross-sectional view of the example first lens assembly of FIG. 2.
Figure 4:
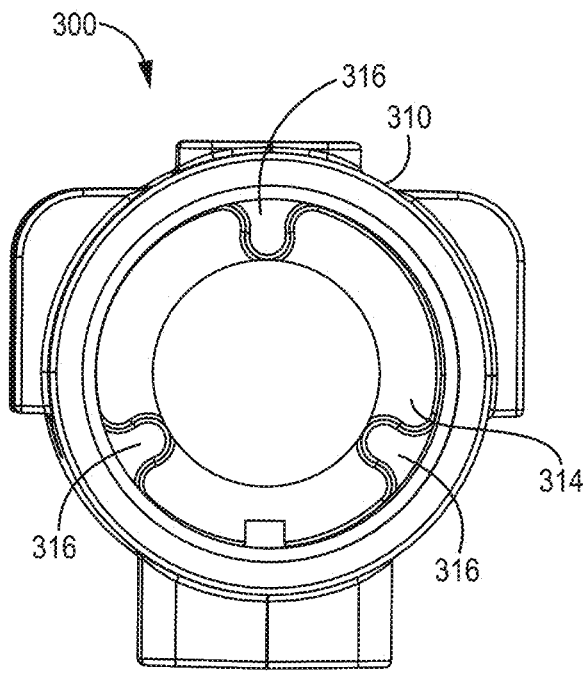
FIG. 4 is a facing view of the example first lens assembly of FIG. 2.

The first lens assembly 300 has a first lens barrel 310 and a first lens 312 mounted in the first lens barrel 310. The first lens barrel 310 is coupled to the optical frame 100, such via a fastener opening 318. Coupling the first lens barrel 310 to the optical frame 100 will be described in more detail below. FIG. 2 depicts a perspective view of a first lens assembly 300 consistent with the example of FIG. 1. FIG. 3 depicts a cross-sectional view of the first lens assembly 300, and FIG. 4 depicts a facing view of the first lens assembly 300 without a lens.

The first lens assembly is configured such that optical data passes through the first lens barrel 310 and the first lens 312 to/from the first optical communication device 320 (FIG. 1). The first lens barrel 310 has a first end 301 and a second end 302 and a cavity 304 extending from the first end 301 to the second end 302. The first lens 312 is coupled to the first lens barrel 310 such that the first lens 312 extends across the cavity 304. In particular, the first lens barrel 310 has an inner annular surface 314 (particularly visible in FIG. 4) extending around the cavity. Protrusions 316 extend outward from the inner annular surface 314 and define a first lens mounting structure. In various embodiments, including the example depicted, there are exactly three protrusions 316 that extend outward from the inner annular surface 314 to define the first lens mounting structure. The three protrusions 316 are equally spaced about the inner annular surface 314. The inner annular surface 314 and the three protrusions 316 can be formed by machining operations on the first lens barrel 310.

The first lens 312 is mounted to the first lens mounting structure. In particular, the first lens 312 is in direct contact with each of the three protrusions 316 of the first lens mounting structure. In various embodiments, there is a gap 317 (FIG. 3) between the first lens 312 and the inner annular surface 314 of the first lens barrel 310. In some embodiments, an adhesive can be disposed in the gap 317 between the first lens and the inner annular surface 314. Limiting the direct contact between the first lens 312 and the first lens barrel 310 to the three protrusions 316 can improve the precision of the placement of the first lens 312 in the first lens barrel 310 compared to examples where there is no gap between a lens and an annular surface the lens is mounted on because there is a relatively increased likelihood (by virtue of a larger surface) that the annular surface exhibits surface inconsistencies or irregularities.

The first lens barrel 310 is constructed of a material with a relatively low thermal expansion coefficient. The first lens barrel 310 can have a thermal expansion coefficient of less than $30 \times 10^{-6}$ $K^{-1}$. In various embodiments, the first lens barrel 310 is constructed of a material that has an isotropic thermal expansion coefficient. In various embodiments, the first lens barrel 310 is constructed of metal, such as stainless steel. The first lens 312 is also generally constructed of a material with a relatively low thermal expansion coefficient. In a variety of embodiments, the first lens 312 is constructed of glass. Generally the first lens 312 and the first lens barrel 310 are not constructed of plastic. The direct contact between the three protrusions 316 (constructed of metal) and the first lens 312 (constructed of glass) can provide a relative improvement in the thermal stability of the assembly 10 compared to examples where there is an adhesive preventing direct contact between a lens and its mounting surface.

In various embodiments, in manufacturing a first lens assembly 300 consistent with the technology disclosed herein, the first lens 312 is coupled to the first lens mounting structure 316 by disposing adhesive on the three protrusions 316 of the first lens barrel 310. The first lens 312 is pressed on the three protrusions 316 to create direct contact between each of the three protrusions 316 and the first lens 312. As a result, the adhesive is displaced around the protrusions 316. Pressure can be applied to the first lens 312 on the three protrusions 316 while the adhesive is cured.

In some embodiments, the adhesive is cured by applying heat to the adhesive. In some embodiments, the adhesive is cured by subjecting it to a temperature that is higher than the highest expected operating temperature of the assembly 10. Such a process can increase the likelihood that the adhesive will remain in compression at operational sensor temperatures and can reduce shifting or expansion of the adhesive in response to temperature changes. In some embodiments, the adhesive is cured at a temperature of at least 70 degrees C. In some embodiments, the adhesive is cured at a temperature of at least 75 degrees C. In some embodiments, the adhesive is cured at a temperature of at least 80 degrees C. In some embodiments, the adhesive is cured at a temperature of at least 85 degrees C. In various embodiments, the adhesive is cured at a temperature below about 90 degrees C. In various embodiments, the adhesive is cured at a temperature below about 85 degrees C. In some other embodiments, the adhesive is cured by applying UV radiation to the adhesive (while pressing the first lens 312 against the first lens mounting structure 316).

Returning now to FIG. 1, in various embodiments, including the one depicted, the assembly 10 also has a second lens assembly 400 and a second optical communication device 330, where the second lens assembly 400 has a second lens 412 and a second lens barrel 410. The second lens 412 and the second lens barrel 410 can be constructed of materials similar to that described above with regard to the first lens 312 and the first lens barrel 310, respectively. The second lens 412 and the second optical communication device 330 are configured to be in optical communication. The second optical communication device 330 is generally configured to receive or send optical data transferred through the second lens assembly 400. In particular, the second optical communication device 330 has an active area 338 (visible in FIG. 8) that is configured to send or receive optical data through the second lens assembly 400. In some embodiments, the second optical communication device 330 is a linear array printed circuit board, and in the currently-depicted embodiment the second optical communication device 330 is a laser emitter assembly. The laser emitter assembly can have a laser emitter such as a laser diode.

Figure 8:
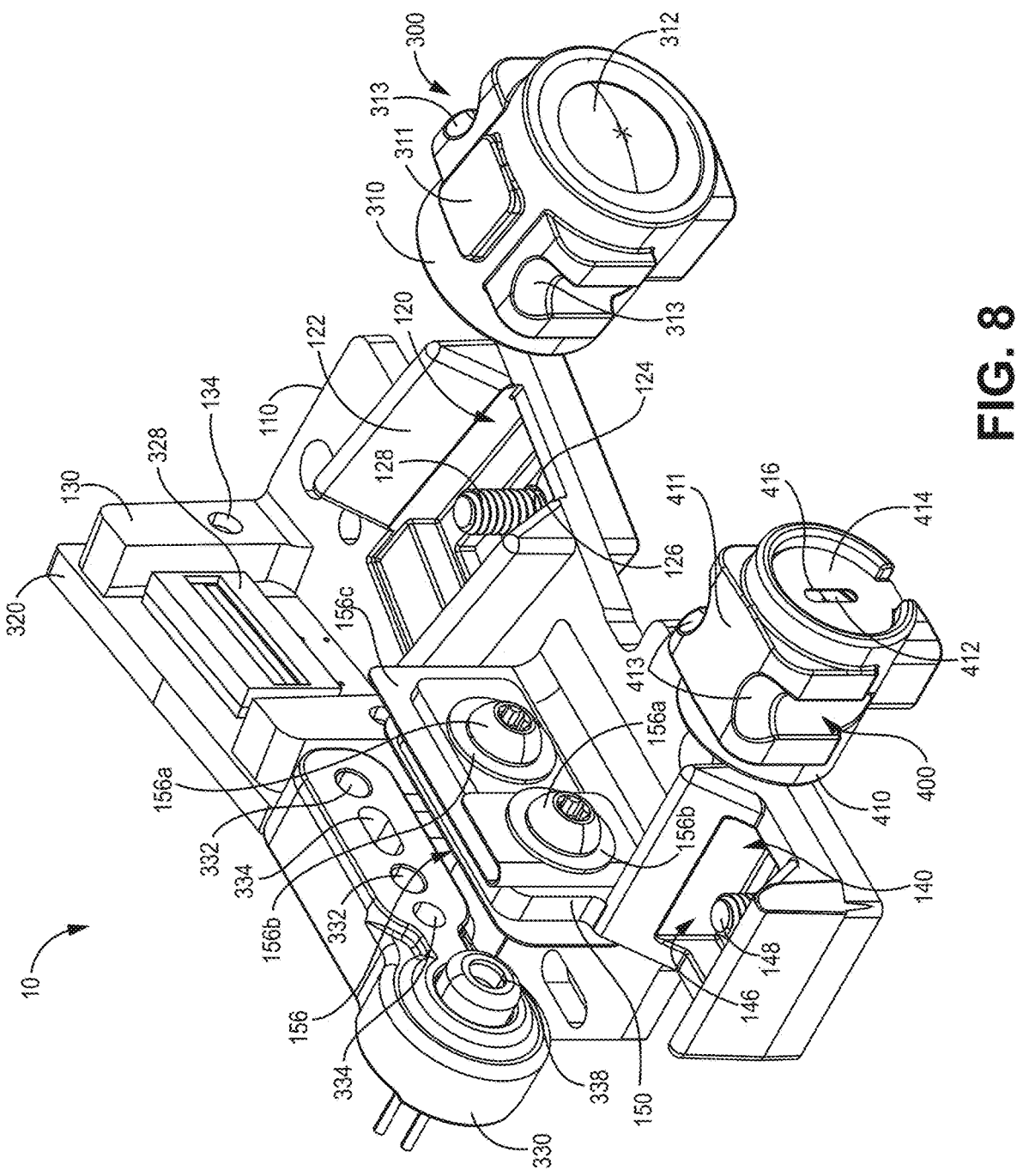
FIG. 8 is a partially exploded perspective view of the assembly of FIG. 1.

The second lens assembly 300 has a second lens barrel 410 and a second lens 412 mounted in the second lens barrel 410, which is particularly visible in FIG. 8. Where the second optical communication device 330 is a laser emitter assembly, a disk 414 defining an aperture 416 can be positioned in the second lens barrel 410 to define the shape of the laser beam emitted from the second lens barrel 410, which is visible in FIG. 1. The second lens barrel 410 is coupled to the optical frame 100, such as with a second barrel fastener 148 (visible in FIG. 8), similarly to that described above with reference to the first lens assembly. The second lens barrel 410 defines a cavity such that optical data passes through the second lens barrel 410 and the second lens 412 to/from the second optical communication device 330. The second lens assembly 400 has a similar configuration to the first lens assembly 300, and the discussion above and corresponding figures with respect to the first lens assembly 300 also generally applies to the second lens assembly 400. For example, the second lens barrel 410 has an inner annular surface and three protrusions extending outward from the inner annular surface to define a second lens mounting structure. The second lens 412 is in contact with each of the three protrusions of the second lens mounting structure and can be mounted to the second lens mounting structure similarly to how the first lens 312 is mounted to the first lens mounting structure 316, discussed above.

Figure 5:
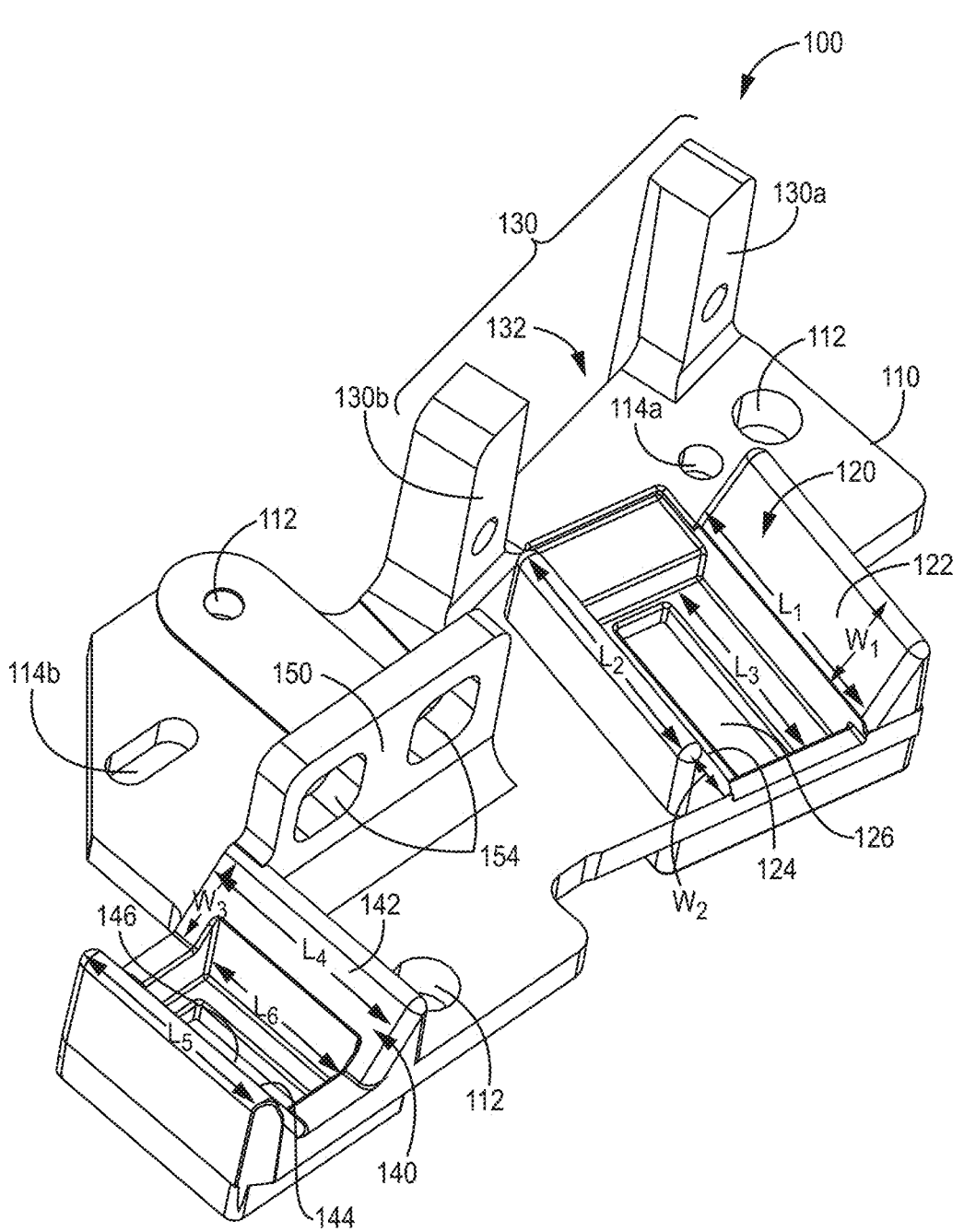
FIG. 5 is a perspective view of an example optical frame consistent with FIG. 1.
Figure 6:
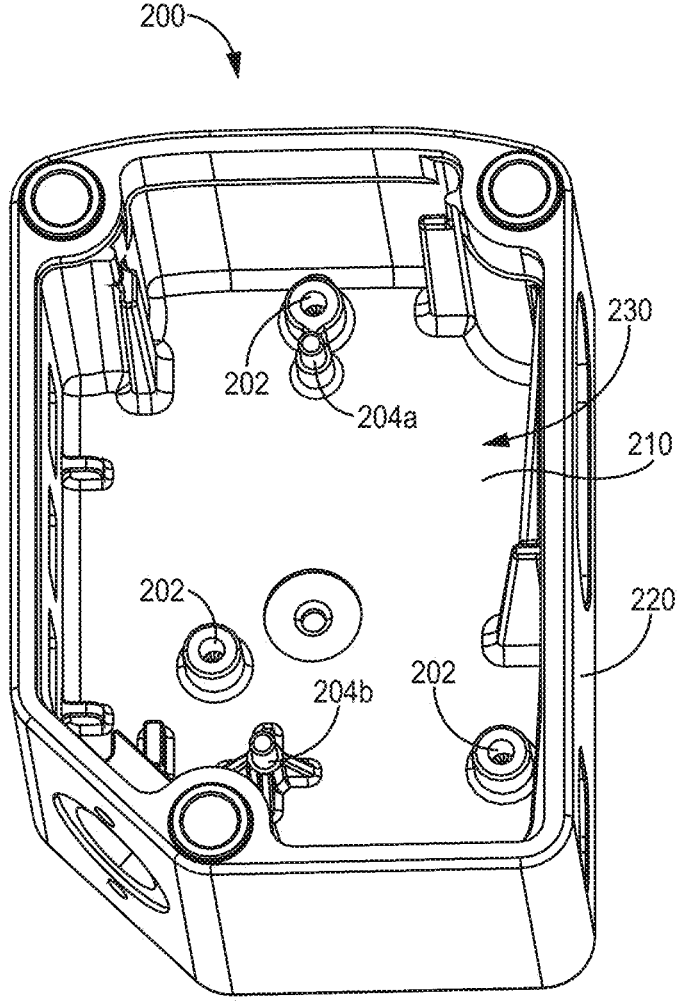
FIG. 6 is a perspective view of an example housing consistent with the technology disclosed herein.
Figure 7:
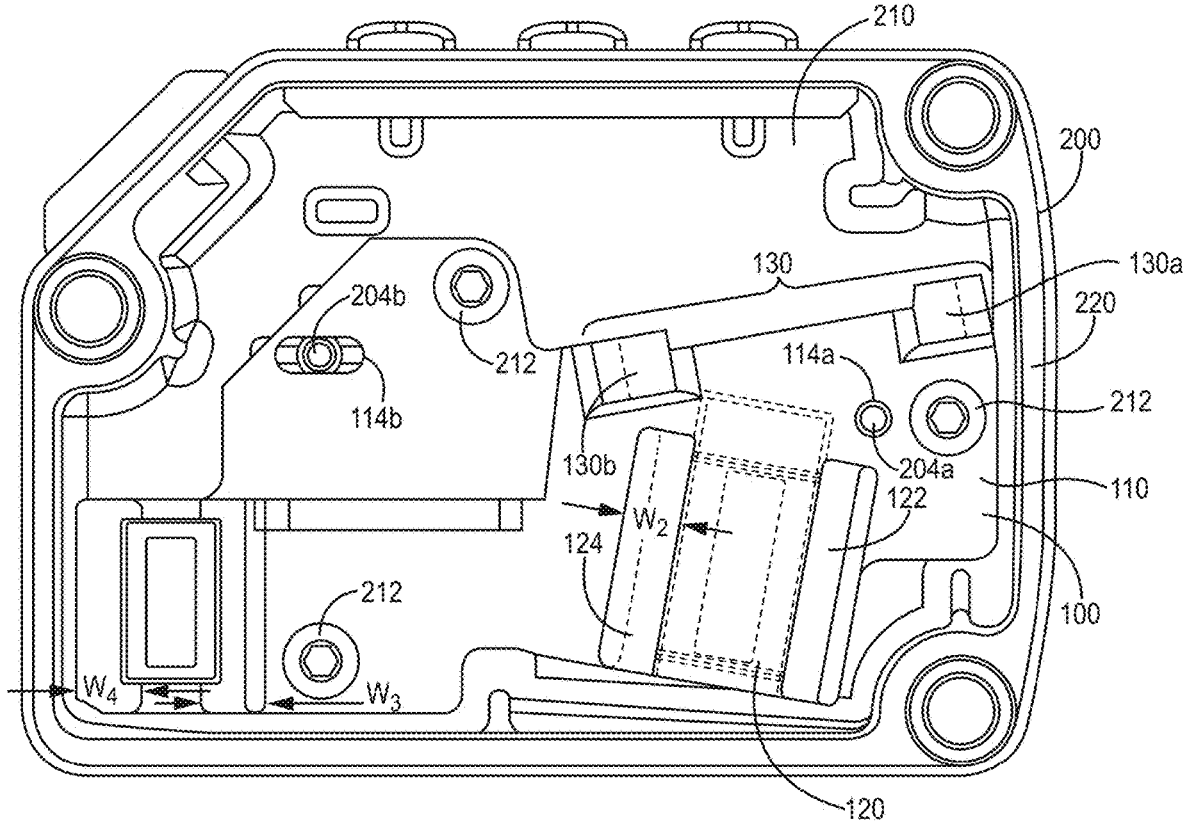
FIG. 7 is a facing view of the optical frame of FIG. 5 coupled to an example housing.

FIG. 5 depicts the optical frame 100 alone, without the various components coupled thereto. As mentioned above, FIG. 6 depicts the example sensor housing 200. FIG. 7 depicts the optical frame 100 coupled to the sensor housing 200. The sensor housing 200 will now be described in more detail.

The sensor housing 200 is generally configured to house the sensor assembly components. In particular, the sensor housing 200 is configured to couple to the optical frame 100, which is coupled to the sensor components. The sensor housing 200 defines a cavity 230 that is configured to receive the sensor components. The cavity 230 is particularly defined by a housing base 210 and a plurality of sidewalls 220 extending outwardly from the housing base 210. In the current example, each of the plurality of sidewalls 220 extend orthogonally from the housing base 210.

The housing base 210 is generally configured to be coupled to the optical frame 100. In particular, the housing base 210 has a plurality of fastening structures 202 that are configured to enable coupling to the optical frame 100. Here the fastening structures 202 are fastener receptacles configured to receive a fastener such as a screw, a bolt, or the like. In various embodiments, the housing base 210 is configured to couple to the optical frame 100 at exactly three locations that correspond to the locations of the three fastening structures 202. Attaching components with metal fasteners such as screws and bolts minimizes use of glue and can decrease the temperature sensitivity of the assembly 10.

In various examples, including the one depicted, the housing base 210 has one or more alignment features 204a, 204b extending outwardly from the housing base 210 that are configured to align with mating features of the optical frame 100, which will be described in more detail below. In the current example the alignment features 204a, 204b are two pins extending orthogonally to the housing base 210, which will be described in more detail below.

The sensor housing 200 (FIGS. 6, 7 and 10) is a single, unitary structure in various embodiments. In some embodiments the sensor housing 200 is machined or molded in a unitary structure. Constructing the sensor housing 200 as a single, unitary structure can reduce the impact of thermal expansion on the components directly or indirectly coupled to the sensor housing 200. The sensor housing 200 can be constructed of various types of materials and combinations of materials. Generally, the sensor housing 200 is constructed of a material with a relatively low thermal expansion coefficient. The sensor housing 200 can have a thermal expansion coefficient of less than $30 \times 10^{-6}$ K$^{-1}$. In various embodiments, the sensor housing 200 is constructed of a material that has an isotropic thermal expansion coefficient. In various embodiments, the sensor housing 200 is constructed of metal, such as stainless steel. In various embodiments, the sensor housing 200 lacks plastic.

As mentioned above, the sensor housing 200 is configured to be coupled to the optical frame 100, such as that depicted in FIGS. 5 and 7. The optical frame 100 is also generally configured to be coupled to the various components of the optical assembly (see FIG. 1). As such, the optical frame 100 is configured to secure the various components of the optical assembly in the sensor housing 200.

Similar to the sensor housing 200, the optical frame 100 is also a single, unitary structure in various embodiments for reasons mentioned above. The optical frame 100 can be constructed of various types of materials and combinations of materials. In various embodiments, the optical frame 100 is constructed of a material with a relatively low thermal expansion coefficient, such as stainless steel. The optical frame 100 can be constructed of materials similar to that of the sensor housing 200 such as metal, discussed above. In various embodiments, the optical frame 100 is constructed of the same material as the sensor housing 200. In various embodiments, the optical frame 100 lacks plastic.

The optical frame 100 has at least a frame base 110, a first device mounting plate 130, and a first barrel mounting channel 120. The frame base 110 is configured to be coupled to the housing base 210, which is depicted in FIG. 7. In the current example, the frame base 110 has a plurality of fastening structures 112 (FIG. 5) that are configured to be coupled to the housing 200 (FIG. 6). Here the fastening structures 112 (FIG. 5) are fastener receptacles that are configured to align with the corresponding fastener receptacles (fastening structures 202) on a housing base 210 of the housing 200 (FIG. 6). The fastener receptacles of the housing base 210 and the frame base 110 are configured to mutually receive fasteners 212 such as screws, bolts, or the like, that couple the optical frame 100 to the sensor housing 200, as shown in FIG. 7. As mentioned above, attaching components with metal fasteners such as screws and bolts minimizes use of glue and can decrease the temperature sensitivity of the assembly 10.

FIGS. 5 and 7 show the mating features 114a, 114b defined by the frame base 110 of the optical frame 100 that are configured to align with alignment features 204 of the sensor housing 200. A first mating feature 114a is a pin opening configured to receive a first pin 204a of the sensor housing 200. A second mating feature 114b is a pin slot configured to receive a second pin 204b of the sensor housing. Other types of alignment features are also contemplated. For example, in some embodiments the sensor housing can define a pin opening and the optical frame can define a pin that is received by the pin opening. Furthermore, in some embodiments the alignment features of the sensor housing can extend inwardly from a sidewall to mate with a mating feature of the optical frame. Other configurations are certainly contemplated.

The first device mounting plate 130 of the optical frame 100 is generally configured to secure to the first optical communication device 320 (FIG. 1). The first device mounting plate 130 extends orthogonally outward from the frame base 110. In the current example, the device mounting plate 130 has a first plate portion 130a and a second plate portion 130b that define a gap 132 therebetween, such that the active area 328 of the first optical communication device 320 is in optical communication with the first lens. In some other embodiments the first device mounting plate 130 is a single plate structure, in which case the first optical communication device can be secured to the device mounting plate to place the active area 328 of the first optical communication device 320 in optical communication with the first lens 312.

The first device mounting plate 130 defines one or more securing structures 134 that are configured to enable securing of the first optical communication device 320 to the first device mounting plate 130. In the current example, the securing structures 134 are fastener openings that are configured to align with corresponding fastener openings 322 on the first optical communication device 320, which is visible in FIG. 9. Specifically, the first optical communication device 320 is secured to the first device mounting plate 130 with a first securing device 136 (shown exploded out from the assembly 10 in FIG. 9). In the current example there are two first securing devices 136. The first securing device 136 mutually engages the first optical communication device 320 and the first device mounting plate 130 to secure them together.

In the current example, the first securing device 136 is a screw 136a and a washer 136b disposed between the screw 136a and the first optical communication device 320. When fully assembled, the screw 136a positively engages the first mounting structure in its fastener opening 134 and the washer 136b positively engages the first optical communication device 320 on a surface 326 around the fastener opening 322. The washer 136b generally directly contacts the first optical communication device 320.

In various embodiments, the screw 136a and the washer 136b are each constructed of metal such as stainless steel or another material that has a relatively low thermal expansion coefficient. In various embodiments, the screw 136a and the washer 136b are each constructed out of the same material as the optical frame. In some embodiments, the screw 136a is configured to make direct contact with the optical frame 100, meaning that there are no intervening materials such as adhesives or gaskets between the screw 136a and the first device mounting plate 130 within its fastener opening 134. In some other embodiments, the screw 136a can be secured to the first device mounting plate 130 with a thread-locking material to prevent loosening of the screw 136a over time. These configurations can improve the thermal stability of the overall assembly 10.

The fastener opening 322 of the first optical communication device 320 is generally larger than the fastener opening 134 of the first device mounting plate 130, where the fastener opening 134 of the first device mounting plate 130 is sized to positively engage the screw 136a of the first securing device 136. As such, before the first securing device 136 fully secures the first optical communication device 320 to the first device mounting plate 130, the first optical communication device 320 is translatable relative to the first device mounting plate 130.

During manufacturing of the assembly 10, the position of the first optical communication device 320 relative to the optical frame 100 is adjusted to bring various components into alignment, such as to align the first optical communication device 320 and the first lens 312. For example, the screw 136a of the first securing device 136 is inserted through the fastener openings 322, 134 of the first optical communication device 320 and the first device mounting plate 130 to positively engage the first device mounting plate 130. The screw 136a can be tightened until there is frictional engagement between the washer 136b and the surface 326 around the fastener opening 322 of the first optical communication device 320.

The first optical communication device 320 is translated relative to the first device mounting plate 130 in a first translation plane 321 (FIG. 9) that is orthogonal to the frame base 110. In particular, the first translation plane 321 is mutually defined by the first device mounting plate 130 and the first optical communication device 320. More particularly, the first translation plane 321 can be mutually defined by the interface between the first device mounting plate 130 and the first optical communication device 320. The first optical communication device 320 is translated along the first translation plane 321 to optically align various components of the system, such as optically aligning the first optical communication device 320 with the first lens 312.

The fastener opening 322 of the first optical communication device 320 defines the translation limits of the screw 136a and, therefore, the first optical communication device 320 that is coupled to the screw 136a in the first translation plane 321. When the first optical communication device 320 is in a proper position determined during alignment and focusing processes, the first securing device 136 can be further secured, such as by tightening the screw 136a to secure the first optical communication device 320 to the first device mounting plate 130 in a particular position on the first translation plane 321.

In various embodiments, the first optical communication device 320 is translated relative to the first device mounting plate 130 while the first optical communication device 320 is pressed on the first device mounting plate 130 with a preload force, where the first device mounting plate 130 is secured in a fixed position. The preload force can reduce the opportunity for the position of the first optical communication device 320 to shift relative to the first device mounting plate 130 when securing the first optical communication device 320 to the first device mounting plate 130 after optically aligning the first optical communication device 320 with other system components. The preload force is applied in a direction orthogonal to a plane defined by the first device mounting plate 130.

The amount of preload force exerted on the first optical communication device can depend on a variety of factors including the materials used to form the first optical communication device 320 and the first device mounting plate 130, the structure of the interface between the first optical communication device 320 and the first device mounting plate 130, and the like. In some embodiments, the preload force that is applied is about equal to the target amount of force that the first securing device(s) 136 will apply to the first optical communication device 320 when securing the first optical communication device 320 to the first device mounting plate 130, where "about equal to" means within 4%. In some other embodiments, the preload force that is applied is greater than the target amount of force that the first securing device 136 will apply to the first optical communication device 320 when securing the first optical communication device 320 to the first device mounting plate 130. Preload force can be applied to the first optical communication device 320 via springs, for example.

Figure 9:
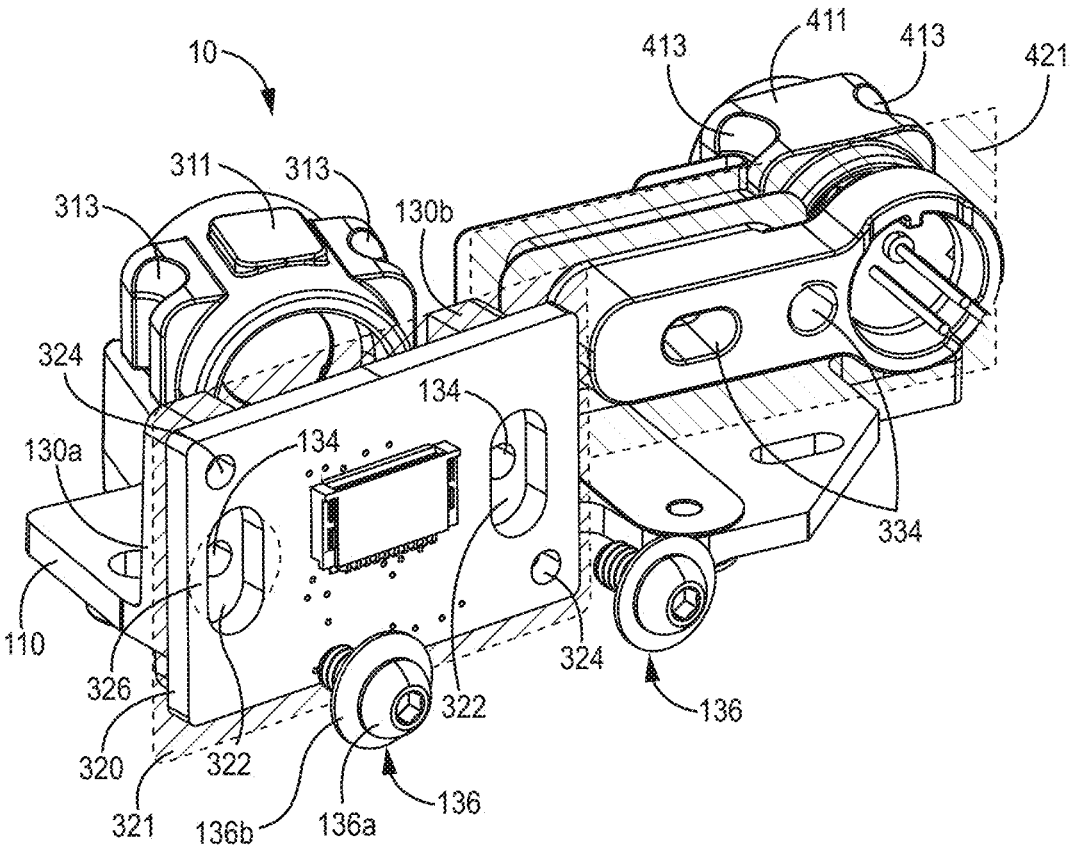
FIG. 9 is a partially exploded perspective view of the example assembly of FIG. 1 from a second perspective.

In embodiments consistent with FIG. 9, the first optical communication device 320 defines pin receptacles 324 that can be used to position and translate the first optical communication device 320 relative to the first device mounting plate 130, where the first device mounting plate 130 is secured in a fixed position. Manufacturing equipment (not currently depicted) can have mating features that are received by the pin receptacles 324, which can facilitate translation of the first optical communication device 320. Such manufacturing equipment can also apply the preload force to the first optical communication device 320.

The configuration of the first optical communication device 320 and the first device mounting plate 130 can have a number of advantages. For example, aligning the first optical communication device 320 is a relatively efficient process because the first optical communication device 320 has only two degrees of freedom when mounted to the first device mounting plate 130. Furthermore, after the first optical communication device 320 has been positioned to achieve the appropriate alignment, securing the first optical communication device 320 to the first device mounting plate 130 by simply tightening the screw 326a can reduce the likelihood that the first optical communication device 320 will shift out of alignment compared to other fastening mechanisms. Furthermore, the screw $136a$ can be repositioned in the event that the first optical communication device $320$ does shift out of alignment for some reason.

In some other embodiments, the fastener opening of the first device mounting plate can be sized larger than the corresponding fastener opening of the first optical communication device. In such embodiments the securing device, such as a screw, can be configured to pass through the first device mounting plate and positively engage the first optical communication device within its respective fastener opening. In such embodiments the fastener opening of the first device mounting plate would define the outer boundaries of translation of the securing device (and, therefore, the attached first optical communication device) relative to the first device mounting plate. Other types of fastening between the first device mounting plate and the first optical communication device can also be implemented.

Referring back to FIG. 1, the first barrel mounting channel $120$ is generally configured to receive a first lens barrel $310$. In various embodiments, the first barrel mounting channel $120$ is configured to enable linear translation of the first lens barrel $310$ along the first barrel mounting channel $120$ to position the first lens barrel $310$ when assembling the device. The first barrel mounting channel $120$ of the optical frame $100$ is defined by a first sidewall $122$ and a second sidewall $124$. The first sidewall $122$ has a width $w_1$ extending outwardly from, and obliquely to, the frame base $110$ and a length $L_1$ extending parallel to the frame base $110$. Similarly, the second sidewall $124$ has a width $w_2$ (visible in FIG. 7) extending obliquely outward from the frame base $110$ and a length $L_2$ extending parallel to the frame base $110$. The length $L_1$ of the first sidewall $122$ is generally parallel to the length $L_2$ of the second sidewall $124$. The width $w_1$ of the first sidewall $122$ is generally non-parallel to the width $w_2$ of the second sidewall $124$.

The first lens barrel $310$ is disposed in the first barrel mounting channel $120$ in contact with the first and second sidewalls $122$, $124$. When the first lens barrel $310$ is disposed in the first barrel mounting channel $120$, the first lens $312$ extends across a portion of the first barrel mounting channel $120$. And, because the first lens $312$ and the active area $328$ of the first optical communication device $320$ are configured to be in optical communication, this means that the first barrel mounting channel $120$ at least partially aligns with the gap $132$ between the first plate portion $130a$ and the second plate portion $130b$ of the first device mounting plate $130$.

The first sidewall $122$ and the second sidewall $124$ (best visible in FIG. 7) generally define a linear translation pathway of the first lens barrel $310$ along the frame base $110$. Such a configuration can enable focusing of the first lens assembly $300$ during manufacturing of the assembly $10$ while maintaining the position and orientation of the first lens barrel $310$ in the remaining dimensions. Furthermore, by limiting the contact area between the optical frame $100$ and the first lens barrel $310$, shifting of the first lens barrel $310$ based on thermal expansion of the optical frame $100$ can be limited.

Generally the assembly is configured such that there is no adhesive disposed between the first lens barrel $310$ and the optical frame $100$. The first lens barrel $310$ can be selectively secured to the first and second sidewalls $122$, $124$ with a first barrel fastener $128$, which is visible in FIG. 8 that is a partially exploded view of the assembly of FIG. 1. In the current example, the first barrel fastener $128$ extends into the first barrel mounting channel $120$ and couples to both the frame base $110$ and the first lens barrel $310$. The first barrel fastener $128$ extends through an opening $126$ in the frame base $110$ into the first barrel mounting channel $120$ and positively engages the first lens barrel $310$. The first barrel fastener $128$ can be a screw or a bolt.

In various embodiments consistent with the current technology, the opening $126$ in the frame base $110$ is a first elongate slot $126$ defined between the first sidewall $122$ and the second sidewall $124$ through the frame base $110$. The elongate slot $126$ has a length $L_3$ (FIG. 5) that is parallel to the lengths of both the first sidewall $122$ and second sidewall $124$. The first elongate slot $126$ defines a translation pathway of the first barrel fastener $128$ that is parallel to the linear translation pathway of the first lens barrel $310$. The first elongate slot $126$ defines the length of the linear translation pathway of the first barrel fastener $128$ and, therefore, the length of the linear translation pathway of the first lens barrel $310$.

During production of the assembly $10$, the first barrel fastener $128$ is coupled to the first lens barrel $310$ to secure to the first lens barrel $310$, but the first barrel fastener $128$ does not secure to the optical frame $100$. The linear position of the first lens assembly $300$ is adjusted along the first barrel mounting channel $120$ to focus the first lens $312$. The first barrel fastener $128$ correspondingly translates along the first elongate slot $126$ during this adjustment. When the first lens $312$ is focused appropriately, the first barrel fastener $128$ is tightened to secure the first lens barrel $310$ to the first sidewall $122$ and second sidewall $124$ in position. In the current example, tightening the first barrel fastener $128$ to secure the first lens barrel $310$ results in the first barrel fastener $128$ positively engaging the optical frame $100$.

In various embodiments, the first lens barrel $310$ is pressed into the first barrel mounting channel $120$ with a preload force while (1) the first lens barrel $310$ is focused (by sliding the first lens barrel $310$ linearly along the first barrel mounting channel $120$) and then (2) secured to the first barrel mounting channel $120$. The preload force can be applied in a direction orthogonal to the frame base $110$. The preload force can be applied in a direction orthogonal to the first barrel mounting channel $120$. The first lens barrel $310$ can define a receiving surface $311$ that is configured to receive the preload force. The receiving surface $311$ can be parallel to the frame base $110$ and/or the barrel mounting channel $120$. In various embodiments, the preload force in applied to the receiving surface $311$ in a direction that is orthogonal to the receiving surface $311$ of the first lens barrel $310$.

The preload force can be consistent with preload forces described above with reference to the first optical communication device $320$. In some embodiments, the preload force that is applied is about equal to or greater than the target amount of force that the first barrel fastener $128$ will apply to the first lens barrel $310$ when securing the first lens barrel $310$ to the first barrel mounting channel $120$.

In the current example, the first lens barrel $310$ defines pin receptacles $313$ that can be used to position and translate the first lens barrel $310$ relative to the first barrel mounting channel $120$. Manufacturing equipment (not currently depicted) can have mating features that are received by the pin receptacles $313$ and can facilitate translation of the first lens barrel $310$. Such manufacturing equipment can also apply the preload force to the receiving surface $311$ of the first lens barrel $310$.

The first barrel fastener $128$, first barrel mounting channel $120$, and the first lens barrel $310$ can have a variety of other configurations consistent with the technology disclosed herein. In some embodiments, instead of an elongate slot defined by the optical frame, the optical frame can define a fastener opening that maintains the linear position of the first barrel fastener, and the first lens barrel can define an elongate slot that receives the first barrel fastener. In such instances the elongate slot can be a linear translation pathway of the first lens barrel relative to the first barrel fastener that allows linear positioning of the first lens barrel in the barrel mounting channel while the first barrel fastener is in a fixed position. In some other embodiments the first barrel fastener does not extend into the first barrel mounting channel through the optical frame base.

The configuration of the first barrel fastener, first barrel mounting channel and the first lens barrel has a number of advantages for manufacturing that can generally improve the repeatability and precision of the process. For example, focusing the first lens barrel is a relatively efficient process because the first lens barrel has only one degree of freedom when positioned in first barrel mounting channel. Furthermore, after the first lens has been positioned to achieve the appropriate focus, securing the first lens barrel in the first barrel mounting channel by tightening the first barrel fastener can reduce the likelihood that the first lens barrel will shift out of focus compared to fastening mechanisms that require repositioning the first lens barrel after focus has been achieved (such as to administer adhesive, for example). Furthermore, a first barrel fastener that is a screw or a bolt can be repositioned in the event that the first lens does shift out of focus.

In various embodiments, the first barrel fastener is constructed of metal such as stainless steel or another material that has a relatively low thermal expansion coefficient. In various embodiments, the first barrel fastener is constructed out of the same material as the first lens barrel and/or the optical frame. In some embodiments, the first barrel fastener is configured to make direct contact with both the optical frame and the first lens barrel, meaning that there are no intervening materials such as adhesives or gaskets between the first barrel fastener and the first lens barrel and the first barrel fastener and the optical frame. In some other embodiments, the first barrel fastener can be secured with a thread-locking material to prevent loosening of the fastener over time. These configurations can improve the thermal stability of the overall assembly.

In various examples, including those depicted herein, the optical frame 100 also has a second device mounting plate 150 and a second barrel mounting channel 140, which are particularly visible in FIG. 5. The second device mounting plate 150 of the optical frame 100 is generally configured to secure to the second optical communication device 330 (FIG. 1). The second device mounting plate 150 extends orthogonally outward from the frame base 110. In the current example, the second device mounting plate 150 is a single plate structure, and the second optical communication device 330 is secured to the second device mounting plate 150 to place the active area 338 (FIG. 8) of the second optical communication device 330 in optical communication with the second lens 412.

The second device mounting plate 150 defines one or more securing structures 154 that are configured to enable securing of the second optical communication device 330 to the second device mounting plate 150. In the current example, the securing structures 154 are fastener openings that are configured to align with corresponding fastener openings 332 on the second optical communication device 330, which are visible in FIG. 8. The fastener openings 332 can be blind openings that do not extend through the entire device and thus are not visible from the perspective in FIG.

9. Specifically, the second optical communication device 330 is secured to the second device mounting plate 150 with a second securing device 156 (shown in the assembly 10 of FIG. 8). In the current example there are two second securing devices 156. The second securing device 156 mutually engages the second optical communication device 330 and the second device mounting plate 150 to secure them together.

In the current example, the second securing device 156 is a screw 156a, a washer 156b disposed between the screw 156a and the second device mounting plate 150, and a bracket 156c disposed between the washer 156b and the second device mounting plate 150. When fully assembled, the screw 156a positively engages the second optical communication device 330 in its fastener opening(s) 332 and the bracket 156c positively engages a surface of the second device mounting plate 150 around the fastener opening(s) 154. In some embodiments the bracket 156c can be omitted and the washer 154b positively engages a surface of the second device mounting plate 150 around the fastener opening 154.

In various embodiments, the screw 156a, the washer 156b, and the bracket 156c are each constructed of metal such as stainless steel or another material that has a relatively low thermal expansion coefficient. In various embodiments, the screw 156a, washer 156b, and bracket 156c are each constructed out of the same material as the optical frame. In some embodiments, the screw 156a is configured to make direct contact with the second optical communication device 330, meaning that there are no intervening materials such as adhesives or gaskets between the screw 156a and the second optical communication device 330 within each of its fastener opening(s) 332. In some other embodiments, the screw 156a can be secured to the second optical communication device 330 with a thread-locking material to prevent loosening of the screw 156a over time. These configurations can improve the thermal stability of the overall assembly 10.

In the current example, the fastener opening 332 of the second optical communication device 330 is generally smaller than the fastener opening 154 of the second device mounting plate 150, where the fastener opening 332 of the second optical communication device 330 is sized to positively engage the screw 156a of the second securing device 156. As such, before the second securing device 156 fully secures the second optical communication device 330 to the second device mounting plate 150, the second optical communication device 330 is translatable relative to the second device mounting plate 150.

During manufacturing of the assembly 10, the position of the second optical communication device 330 relative to the optical frame 100 is adjusted to bring various components into alignment, such as to align the second optical communication device 330 and the second lens 412. For example, the screw 156a of the second securing device 156 is inserted through the fastener openings 332, 154 of the second optical communication device 330 and the second device mounting plate 150 to positively engage the second device mounting plate 150. The screw 156a is tightened until there is slight frictional engagement between the bracket 156c and the surface around the fastener opening 154 of the second device mounting plate 150.

The second optical communication device 330 is translated relative to the second device mounting plate 150 in a second translation plane 421 (FIG. 9) that is orthogonal to the frame base 110. In particular, the second translation plane 421 is mutually defined by the second device mounting plate 150 and the second optical communication device 330. The second translation plane 421 is mutually defined by the interface between the second device mounting plate 150 and the second optical communication device 330. The second optical communication device 330 is translated in the second translation plane 421 to optically align various components of the system, such as optically aligning the second optical communication device 330 with the second lens 412.

The fastener opening 154 of the second device mounting structure defines the translation limits of the screw 156a and, therefore, the second optical communication device 330 that is coupled to the screw 156a in the second translation plane 421. When the second optical communication device 330 is in a proper position that is determined during alignment and focusing processes, the second securing device 156 can be further secured, such as by tightening the screw 156a to secure the bracket to the second device mounting plate 150, which secures the second optical communication device 330 to the second device mounting plate 150 in a particular position on the second translation plane 421.

The configuration of the second optical communication device 330 and the second device mounting plate 150 can have a number of advantages that are consistent with the advantages discussed above with respect to the connection between the first optical communication device 320 and the first device mounting plate 130. Furthermore, the connection between the second optical communication device 330 and the second device mounting plate 150 can be modified in a variety of ways, similar to as discussed above with respect to the first optical communication device 320 and the first device mounting plate 130. For example, the fastener opening 332 of the second optical communication device 330 can be sized larger than the corresponding fastener opening 154 of the second device mounting plate 150.

In various embodiments, the second optical communication device 330 is translated relative to the second device mounting plate 150 while the second optical communication device 330 is pressed on the second device mounting plate 150 with a preload force, where the second device mounting plate 150 is secured in a fixed position. The preload force is applied in a direction orthogonal to a plane defined by the second device mounting plate 150. The preload force can reduce the opportunity for the position of the second optical communication device 330 to shift relative to the second device mounting plate 150 when securing the second optical communication device 330 to the second device mounting plate 150 after optically aligning the second optical communication device 330 with other system components. The amount of preload force exerted on the second optical communication device can depend on a variety of factors similar to that described above with respect to the first optical communication device 320 and the first device mounting plate 130. Also similar to that described above, the preload force that is applied can be about equal to or greater than the target amount of force that the second securing device(s) 156 applies to the second optical communication device 330 when securing the second optical communication device 330 to the second device mounting plate 150.

As visible in FIG. 9, the second optical communication device 330 defines pin receptacles 334 that can be used to position and translate the second optical communication device 330 relative to the second device mounting plate 150, where the second device mounting plate 150 is secured in a fixed position. Manufacturing equipment (not currently depicted) can have mating features that are received by the pin receptacles 324 and can facilitate translation of the second optical communication device 330. Such manufacturing equipment can also apply the preload force to the second optical communication device 330.

The second barrel mounting channel 140 is generally configured to receive the second lens barrel 410. In various embodiments, the second barrel mounting channel 140 is configured to enable linear translation of the second lens barrel 410 along the second barrel mounting channel 140 to position the second lens barrel 410 when assembling the assembly 10. The second barrel mounting channel 140 of the optical frame 100 is defined by a third sidewall 142 and a fourth sidewall 144.

The third sidewall 142 has a width $w_3$ extending outwardly from, and obliquely to, the frame base 110 and a length $L_4$ extending parallel to the frame base 110. Similarly, the fourth sidewall 144 has a width $w_4$ (particularly visible in FIG. 7) extending obliquely outward from the frame base 110 and a length $L_5$ extending parallel to the frame base 110. The length $L_4$ of the third sidewall 142 is generally parallel to the length $L_5$ of the fourth sidewall 144. The length $L_4$ of the third sidewall 142 and the length $L_5$ of the fourth sidewall 144 are generally non-parallel to the length $L_1$ of the first sidewall 122 and the length $L_2$ of the second sidewall 124 of the first barrel mounting channel 120. The width $w_3$ of the third sidewall 142 is generally non-parallel to the width $w_4$ of the fourth sidewall 144.

As visible in FIG. 1, the second lens barrel 410 is disposed in the second barrel mounting channel 140 in contact with the third and fourth sidewalls 142, 144. When the second lens barrel 410 is disposed in the second barrel mounting channel 140, the second lens 412 extends across a portion of the second barrel mounting channel 140. And, because the second lens 412 and the active area 338 of the second optical communication device 330 are configured to be in optical communication, the second barrel mounting channel 140 is configured to align with the active area 338 of the second optical communication device 330.

The third sidewall 142 and the fourth sidewall 144 generally define a linear translation pathway of the second lens barrel 410 along the frame base 110. Such a configuration can enable focusing of the second lens assembly 400 during manufacturing of the assembly 10 while maintaining the position and orientation of the second lens barrel 410 in the remaining dimensions. Furthermore, by limiting the contact area between the optical frame 100 and the second lens barrel 410, shifting of the second lens barrel 410 based on thermal expansion of the optical frame 100 can be limited.

Generally the assembly is configured such that there is no adhesive disposed between the second lens barrel 410 and the optical frame 100. The second lens barrel 410 can be selectively secured to the third and fourth sidewalls 142, 144 with a second barrel fastener 148, which is visible in FIG. 8. In the current example, the second barrel fastener 148 extends into the second barrel mounting channel 140 and couples to both the frame base 110 and the second lens barrel 410. The second barrel fastener 148 extends through an opening 146 in the frame base 110 into the second barrel mounting channel 140 and positively engages the second lens barrel 410. The second barrel fastener 148 can be a screw or a bolt.

In various embodiments consistent with the current technology, the opening 146 in the frame base 110 is a second elongate slot 146 defined between the third sidewall 142 and the fourth sidewall 144 through the frame base 110. The second elongate slot 146 has a length $L_6$ (FIG. 5) that is parallel to the lengths of both the third sidewall 142 and fourth sidewall 144. The second elongate slot 146 defines a translation pathway of the second barrel fastener 148 that is parallel to the linear translation pathway of the second lens barrel 410. The second elongate slot 146 defines the length of the linear translation pathway of the second barrel fastener 148 and, therefore, the length of the linear translation pathway of the second lens barrel 410. It is noted that the second elongate slot 146 is oblique to the first elongate slot 126.

During production of the assembly 10, the second barrel fastener 148 is coupled to the second lens barrel 410 to secure to the second lens barrel 410, but the second barrel fastener 148 does not secure to the optical frame 100. The linear position of the second lens assembly 400 is adjusted along the second barrel mounting channel 140 to focus the first lens 312. The second barrel fastener 148 correspondingly translates along the second elongate slot 146 during this adjustment. When the second lens 412 is focused appropriately, the second barrel fastener 148 is tightened to secure the second lens barrel 410 to the third sidewall 142 and fourth sidewall 144 in position. In the current example, tightening the second barrel fastener 148 to secure the second lens barrel 410 results in the second barrel fastener 148 positively engaging the optical frame 100.

In various embodiments, the second lens barrel 410 is pressed into the second barrel mounting channel 140 with a preload force while (1) the second lens barrel 410 is focused (by sliding the second lens barrel 410 linearly along the second barrel mounting channel 140) and then (2) secured to the second barrel mounting channel 140. The preload force can be applied in a direction orthogonal to the frame base 110. The preload force can be applied in a direction orthogonal to the second barrel mounting channel 140. The second lens barrel 410 can define a receiving surface 411 that is configured to receive the preload force. The receiving surface 411 can be parallel to the frame base 110 and/or the barrel mounting channel 120. In various embodiments, the preload force in applied to the receiving surface 411 in a direction that is orthogonal to the receiving surface 411 of the second lens barrel 410.

The preload force can be consistent with preload forces described above. In some embodiments, the preload force that is applied is about equal to or greater than the target amount of force that the second barrel fastener 148 will apply to the second lens barrel 410 when securing the second lens barrel 410 to the second barrel mounting channel 140.

In the current example, the second lens barrel 410 defines second pin receptacles 413 that can be used to position and translate the second lens barrel 410 relative to the second barrel mounting channel 140. Manufacturing equipment (not currently depicted) can have mating features that are received by the second pin receptacles 413 and can facilitate translation of the second lens barrel 410. Such manufacturing equipment can also apply the preload force to the receiving surface 411 of the second lens barrel 410.

Figure 10:
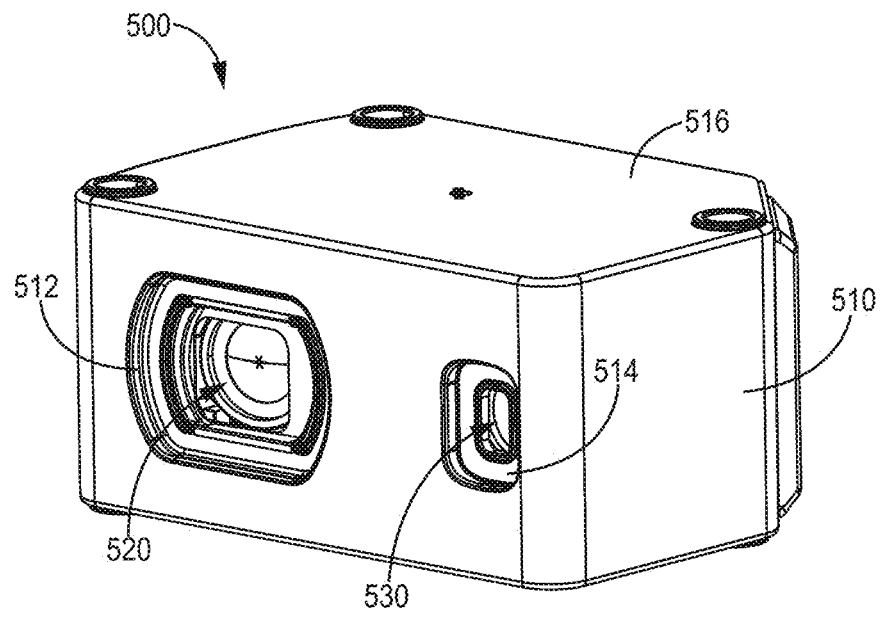
FIG. 10 depicts an example implementation of the technology disclosed herein.

FIG. 10 depicts an example implementation of the technology disclosed herein. The example implementation is a sensor device 500. The sensor device 500 has a housing 510 that can be similar to the housings described herein. The housing 510 can have a cavity that receives an assembly, such as the assemblies discussed herein above. A housing cover 516 can be coupled to the housing 510 to encapsulate the assembly. The housing 510 can define at least a first opening 512 and a second opening 514, where the first opening 512 can be configured to expose a first lens 520 of the assembly to place the first lens 520 in optical communication with the environment outside the housing 510. The housing 510 can define at least a second opening 514 to expose a second lens 530 of the assembly to put the second lens 530 in optical communication with the environment outside the housing 510.

Figure 11:
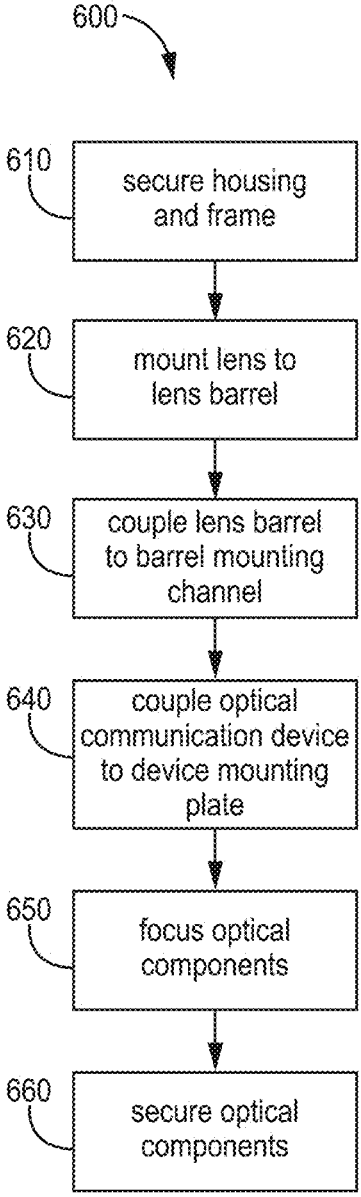
FIG. 11 depicts an example flow chart consistent with some methods disclosed herein.

FIG. 11 depicts an example method 600 associated with assembling a sensor device consistent with the technology disclosed herein. A sensor housing and an optical frame are secured 610. A lens is mounted to a lens barrel 620. A lens barrel is coupled to a barrel mounting channel 630. An optical communication device is coupled to a device mounting plate 640. The optical components are focused 650, and the optical components are secured 660.

The sensor housing and the optical frame are secured 610 consistently with the discussion herein above, where the sensor housing and the optical frame can each be consistent with the discussions herein above. For example, each of the sensor housing the optical frame can be constructed of metal. The sensor housing can have a housing base and the optical frame can have a frame base and the housing base and the frame base can be secured.

The lens can be mounted to the lens barrel 620 consistently with the discussions herein above, where the lens can be a first lens and/or a second lens and the lens barrel can be a first lens barrel and/or a second lens barrel. For example, in various embodiments, the lens barrel has an inner annular surface and three protrusions extending outward from the inner annular surface that define a lens mounting surface. The lens can be coupled to the lens mounting surface. In some embodiments, adhesive is disposed on the three protrusions of the lens barrel and the lens is pressed on the three protrusions to create direct contact between each of the three protrusions and the lens. In such embodiments pressure can be applied to the lens on the three protrusions while the adhesive is cured by applying a temperature or greater than or equal to 70 degrees Celsius or by applying UV radiation.

The lens barrel can be coupled to a barrel mounting channel 630 consistently with the discussions herein above, where the lens barrel and be a first lens barrel and/or a second lens barrel and the barrel mounting channel is part of the optical frame. For example, the lens barrel can be constructed of metal. The lens barrel can be placed in contact with a first sidewall and a second sidewall of the first barrel mounting channel, where the first sidewall and the second sidewall are oblique to the frame base.

The optical communication device can be coupled to a device mounting plate 640 consistently with the discussions herein above, where the optical communication device can be a first optical communication device and/or a second optical communication device. The optical communication device can be a laser emitter and/or a linear array printed circuit board. The device mounting plate can be a first device mounting plate and/or a second device mounting plate. The device mounting plate can extend orthogonally to the frame base.

The optical components can be focused 650 consistently with the discussions herein above, where focusing is intended to encompass both focusing of the lens and alignment of the lens and optical communication device. The lens can be the first lens in a first lens barrel and/or the second lens in a second lens barrel and the optical communication device can be the first optical communication device and/or the second optical communication device. The optical communication device can be translated relative to the mounting plate in a translation plane orthogonal to the frame base to optically align the optical communication device with the lens. The lens barrel can be slid along a barrel mounting channel between two sidewalls to focus the lens, where the two sidewalls can be a first and second sidewall and/or a third and fourth sidewall. In some embodiments, an elongate slot is defined between the two sidewalls, and a fastener is coupled to the lens barrel where the fastener extends through the elongate slot. As such, sliding the lens barrel in the barrel mounting channel slides the fastener along the elongate slot.

In various embodiments, a first preload force is applied to the optical communication device on the mounting plate while the optical communication device is translated relative to the mounting plate, such as in a translation plane mutually defined by the optical communication device and the mounting plate. Similarly, in various embodiments a second preload force is applied to the lens barrel in the barrel mounting channel while focusing the lens, such as by linearly translating the lens barrel along the barrel mounting channel. Such preload forces can reduce the likelihood that the components will shift unpredictably before the components are fully secured.

The optical components can be secured 660 after focusing the optical components 650 consistently with the discussions herein above. For example, the lens barrel can be secured in the barrel mounting channel after focusing the lens. In some instances the lens barrel is secured by securing the frame base to the lens barrel. As another example, the optical communication device can be secured to the device mounting plate after optically aligning the optical communication device with the lens. The optical communicative device can be secured to the device mounting plate while the first preload force is being applied. Similarly, the lens barrel can be secured to the barrel mounting channel while the second preload force is being applied. The first preload force and the second preload force can prevent translation of the relevant components while the components are being secured. The first preload force and the second preload force can have different magnitudes.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. An optical frame comprising:
   a frame base;
   a first mounting channel having a first sidewall extending obliquely to the frame base and a second sidewall extending obliquely to the frame base, the first mounting channel extending to define a linear translation pathway and configured to receive a first lens assembly along the linear translation pathway; and a first device mounting plate defining a first translation plane orthogonal to the frame base, the first device mounting plate configured to couple to a first optical communication device in a particular position in the first translation plane;
   wherein the linear translation pathway is oblique to the first device mounting plate.

2. The optical frame of claim 1, wherein the frame base defines a first elongate slot through the frame base along the linear translation pathway.

3. The optical frame of claim 1, further comprising a first assembly fastener configured to secure the first lens assembly in the first mounting channel.

4. The optical frame of claim 1, further comprising a second mounting channel configured to receive a second lens assembly.

5. The optical frame of claim 4, wherein the frame base defines a second elongate slot through the frame base along the second mounting channel.

6. The optical frame of claim 4, wherein the second mounting channel is oblique to the linear translation pathway.

7. The optical frame of claim 1, further comprising a second device mounting plate defining a second translation plane orthogonal to the frame base, the second device mounting plate configured to couple to a second optical communication device in a particular position in the second translation plane.

8. The optical frame of claim 7, wherein the second translation plane is oblique to the first translation plane.

9. A sensor device comprising:
   a frame base, a first device mounting plate defining a first translation plane orthogonal to the frame base, and a first mounting channel extending in the frame base to define a linear translation pathway;
   a first lens assembly disposed in the first mounting channel; and
   a first optical communication device secured to the first device mounting plate and configured to be secured in a particular position along the first translation plane;
   wherein the linear translation pathway is oblique to the first translation plane.

10. The sensor device of claim 9, wherein the first mounting channel has a first sidewall extending obliquely to the frame base.

11. The sensor device of claim 9, wherein the frame base defines a first elongate slot through the frame base along the first mounting channel.

12. The sensor device of claim 10, wherein the first optical communication device is a laser emitter assembly.

13. The sensor device of claim 9, wherein the first optical communication device is a linear array printed circuit board.

14. The sensor device of claim 9, further comprising a second lens assembly disposed in a second mounting channel.

15. The sensor device of claim 14, wherein the second mounting channel is oblique to the linear translation pathway.

16. The sensor device of claim 14, wherein the frame base defines a second elongate slot through the frame base along the second mounting channel.

17. The sensor device of claim 9, further comprising:
   a second device mounting plate defining a second translation plane orthogonal to the frame base; and a second optical communication device secured to the second device mounting plate and configured to be secured in a particular position along the second translation plane.

18. The sensor device of claim 17, wherein the second translation plane is oblique to the first translation plane.

* * * * *